Aug. 23, 1960
A. W. ZIEGLER
2,950,163
DEVICE FOR RECORDING THE SPEED OF SHUTTERS
IN PHOTOGRAPHIC APPARATUS
Filed April 9, 1959
5 Sheets-Sheet 1
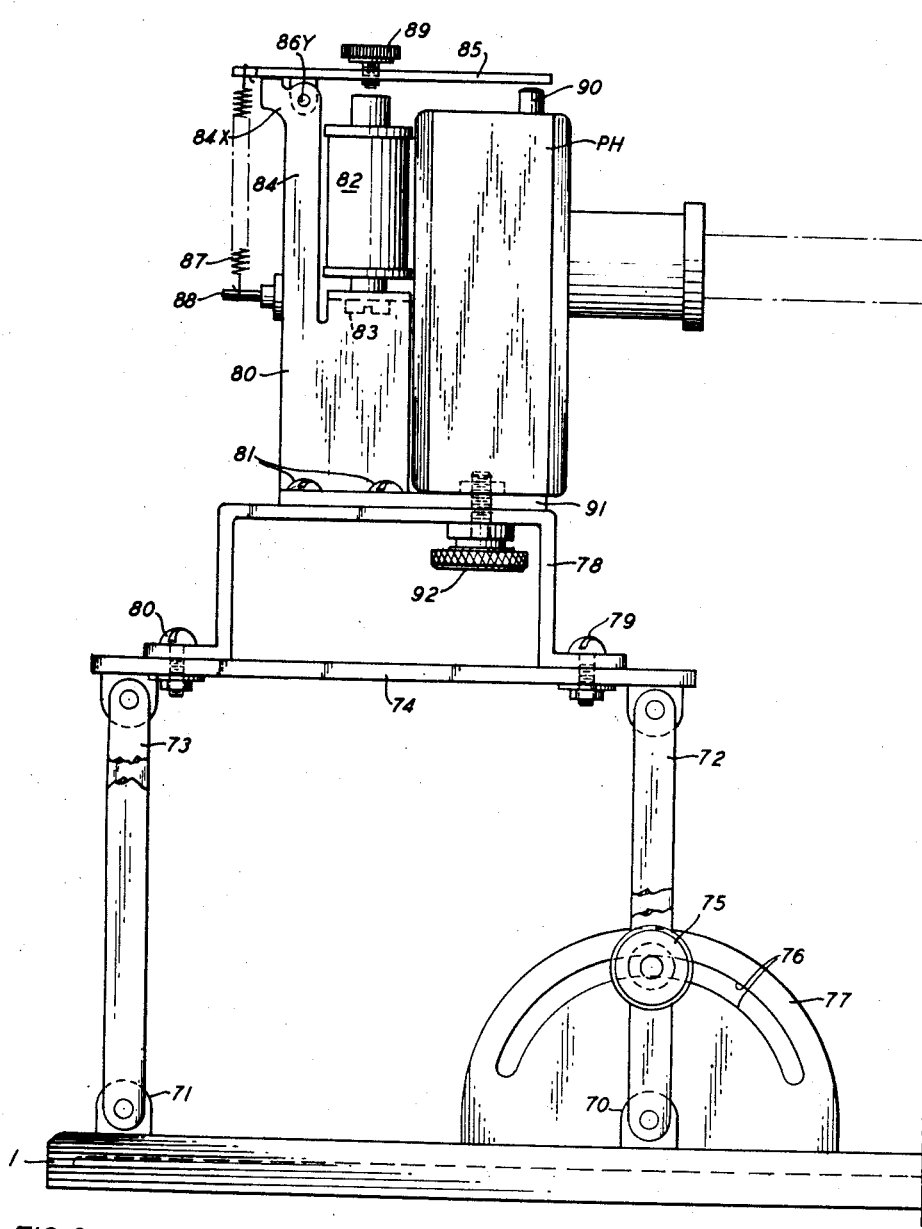
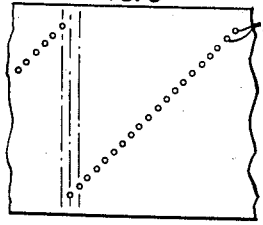
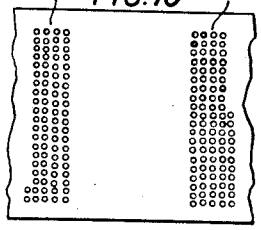
INVENTOR
ARTHUR W. ZIEGLER
BY
Charles D. Richard
ATTORNEY

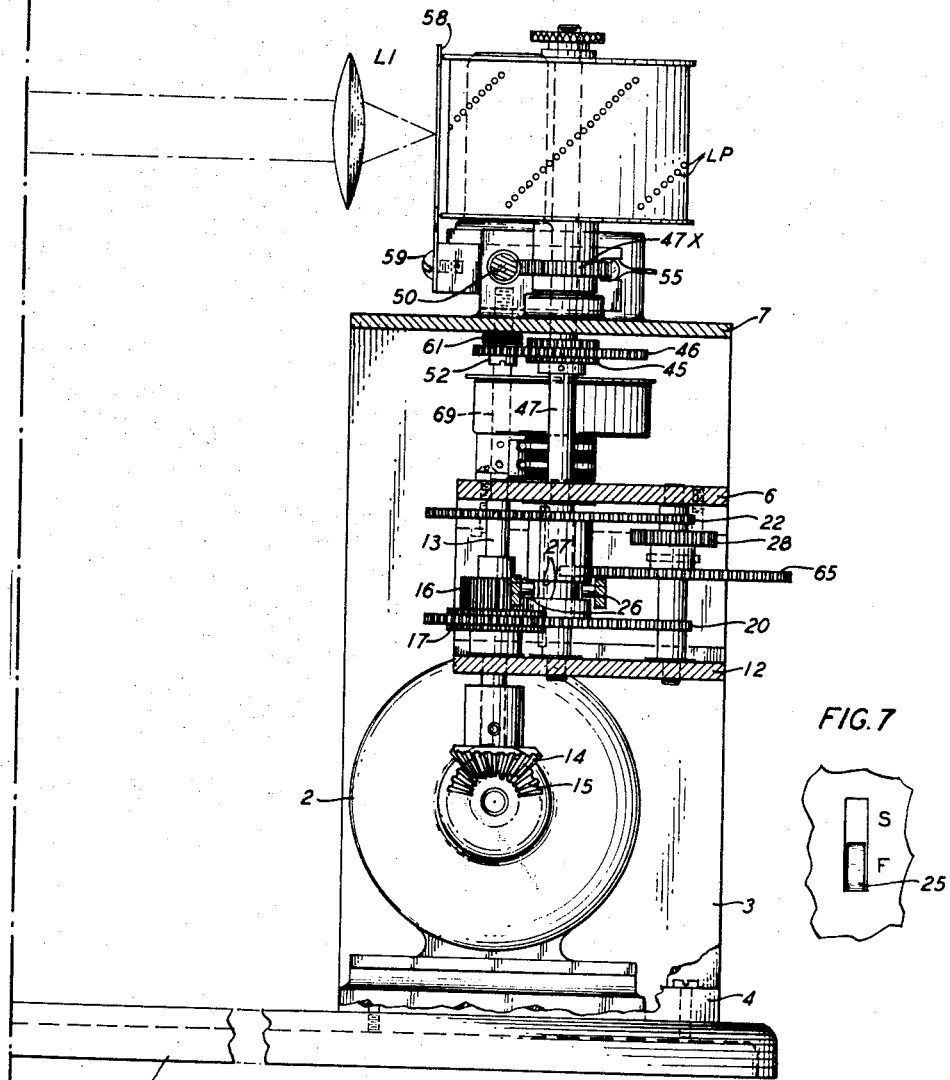

INVENTOR
ARTHUR W. ZIEGLER
BY
Charles D Richard
ATTORNEY

INVENTOR
ARTHUR W. ZIEGLER
BY
Charles D. Richard
ATTORNEY

Aug. 23, 1960   A. W. ZIEGLER   2,950,163
DEVICE FOR RECORDING THE SPEED OF SHUTTERS
IN PHOTOGRAPHIC APPARATUS
Filed April 9, 1959   5 Sheets-Sheet 5

INVENTOR
ARTHUR W. ZIEGLER
BY
Charles D. Richard
ATTORNEY 2,950,163
DEVICE FOR RECORDING THE SPEED OF SHUTTERS IN PHOTOGRAPHIC APPARATUS

Arthur W. Ziegler, 47 Meadowbrook Road,
Short Hills, N.J.

Filed Apr. 9, 1959, Ser. No. 805,296

9 Claims. (Cl. 346—108)

This invention has reference to a device for recording the speed of shutters of the type used in photographic apparatus and the like.

Applicant is aware that attempts have been made to determine the speed of shutters in photographic apparatus by the use of complex and costly equipments, which have been found to require exacting manual control in operation, while being insufficiently accurate even when such equipments are attended by experienced and skilled personnel.

The present invention is related to my patent pending application, Serial No. 711,625, filed January 28, 1959. In that patent pending application is disclosed a mechanism for recording the speed of a shutter in a photographic apparatus in which the rotation of a drum geared to a constant speed motor is provided at its periphery with oblique disposed rows of openings through which light from a lamp in the drum is projected onto a stationary mirror to be reflected onto a rotating mirror, and from the latter reflected onto the shutter of the photographic apparatus to be recorded onto a light sensitized film in the form of parallelly disposed rows of light dots following the tripping of the shutter in such apparatus, the number of light dots thus printed onto the film being an indication of the operating speed of the shutter, which may then be compared with the setting of the shutter speed in the photographic apparatus.

While the device which forms the subject matter of the patent application above mentioned has been found to be most accurate and convenient in use by any unskilled personnel, the present invention makes use of a new and simpler combination of parts in which the operation of a constant speed motor, as a time element, imparts movements to a belt provided with obliquely disposed rows of perforations spaced at equal distance to each other to form paths through which the light from a lamp, mounted between the two parallel sides of the belt, is projected through a slit in a screen disposed on the front of the lamp, onto a lens having its focal length at equal distance from the screen, whereby the light rays from the lens emerge in parallel relation onto the shutter in the photographic apparatus to be printed onto a film therein following the operation of such shutter as effected upon the energizing of an electromagnet in the operating circuit of the recording device.

A mechanism is provided for imparting a rectilinear movement to a carriage supporting the lamp and the screen in the form of a plate disposed in juxtaposition to the front of the perforated belt, the slit in the screen plate extending at right angles relative to the direction of movement of the belt to serve as a common light path to the successive light paths carried by the belt upon the operation of the latter, the operation of the belt being effected by a gearing mechanism operable upon the energizing of the motor following the operation of a switching mechanism.

The novel features of the invention will appear from the following description, and by the claims appended thereto, reference being had to the accompanying drawing in which:

Fig. 1 is a side elevationt view of an adjustable mounting plate adapted to receive the photographic apparatus and its shutter actuating mechanims;

Fig. 2 is a side elevation view of the operating mechanism of the speed recording device, shown with an upright support for the frame removed, and a number of parts shown in sections, with the base shown with portions broken away. Figs. 1 and 2 when joined on the dot and dash lines disclose the assembled relation of the shutter speed recording mechanism and the mounting plate for the photographic apparatus;

Fig. 7 is a detail view showing the lever for shifting gears in the two speed drive mechanism, the lever being positioned for high speed gear operation of the device;

Fig. 9 is a view of a length portion of the belt, showing the relation of the light paths formed by the perforations in such belt; and Fig. 10 is a view of a portion of a film showing the recorded speed of a shutter.

Figure 3:
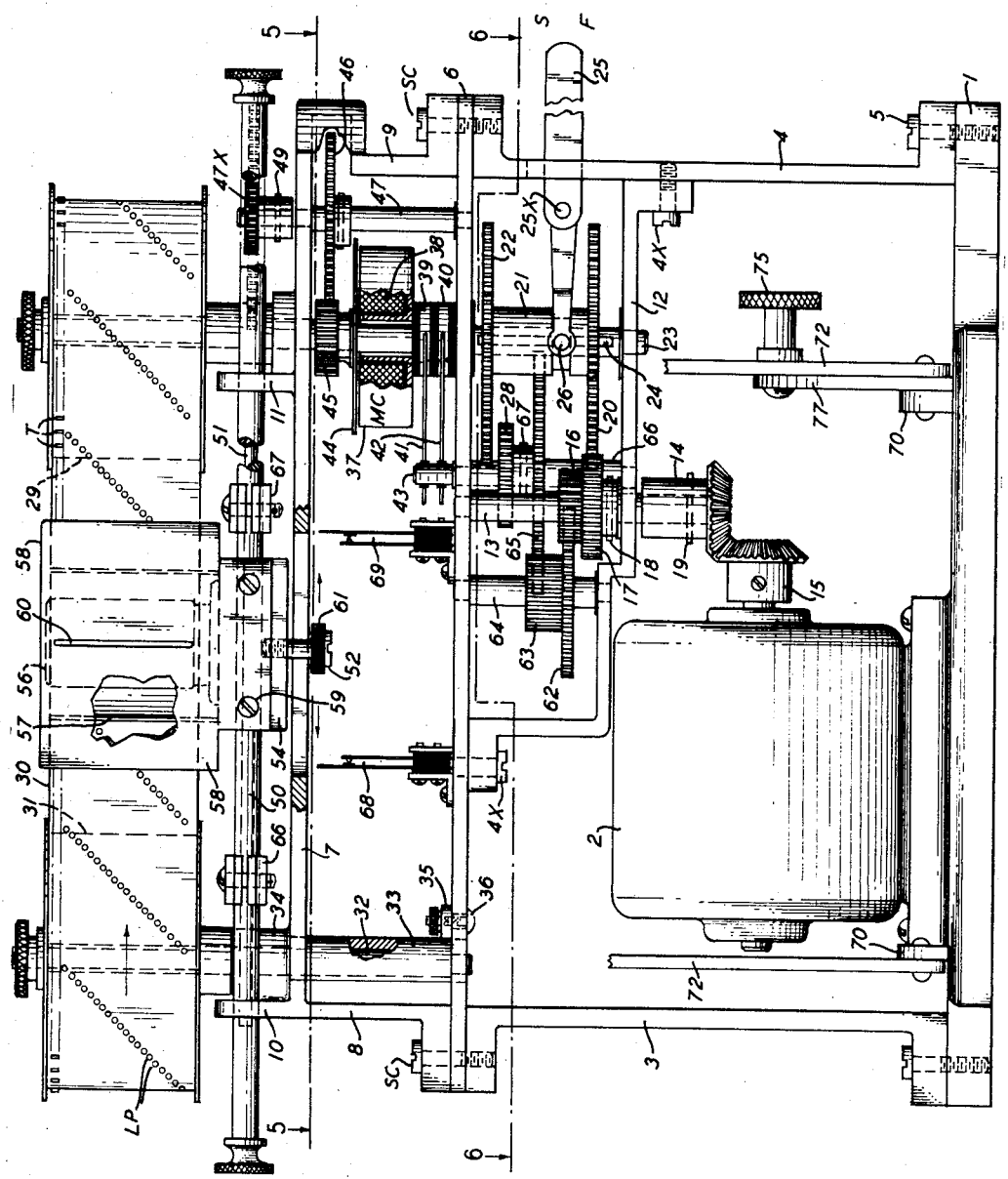
Fig. 3 is a front elevation view of the recording apparatus showing the carriage for moving the shutter plate and the lamp, partly operated.

The recording device of the present invention consists of a base 1 serving for mounting a constant speed motor 2 and a pair of upright supporting members 3 and 4 secured thereon by a plurality of similar screws 5. On the top end of upright members 3 and 4, as best seen in Fig. 3, is secured by a number of screws SC the plates 6 and 7, the latter being formed integrally with spacer arms 8 and 9, and a pair of lug members 10 and 11, provided for a purpose which will be hereinafter described in detail.

Figure 5:
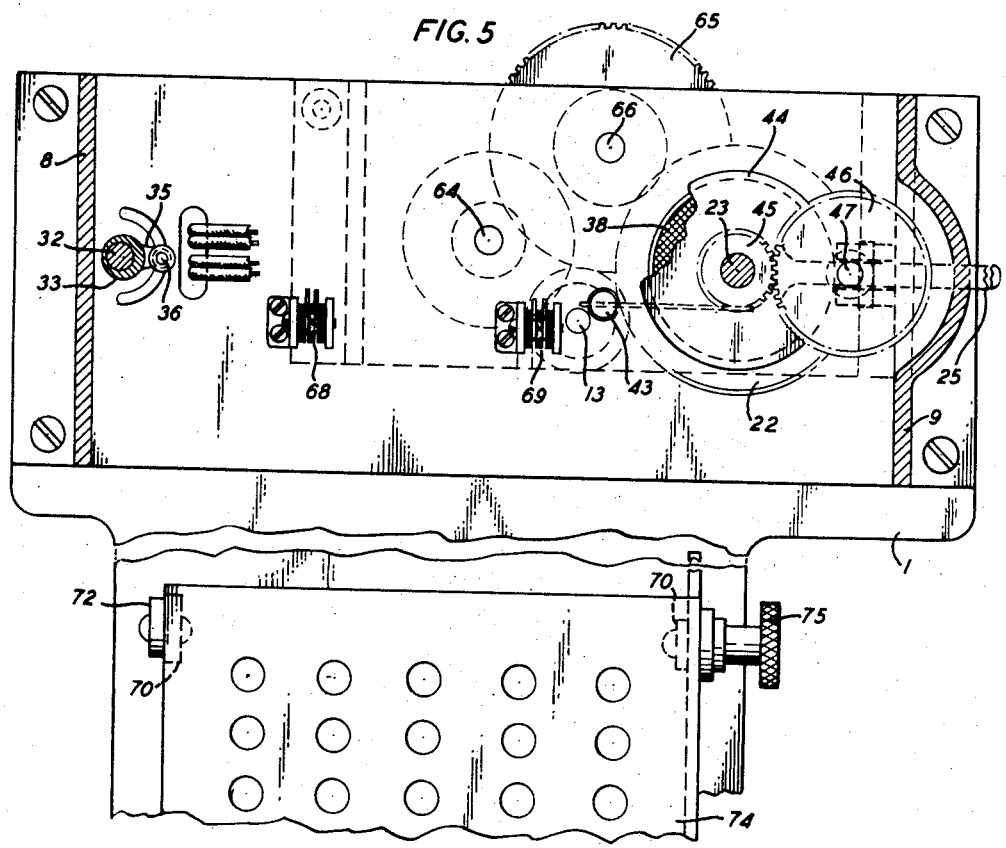
Fig. 5 is a horizontal sectional view taken on line 5—5 of Fig. 3, showing the base and the mounting plate for the photographic apparatus, with portions broken away.
Figure 6:
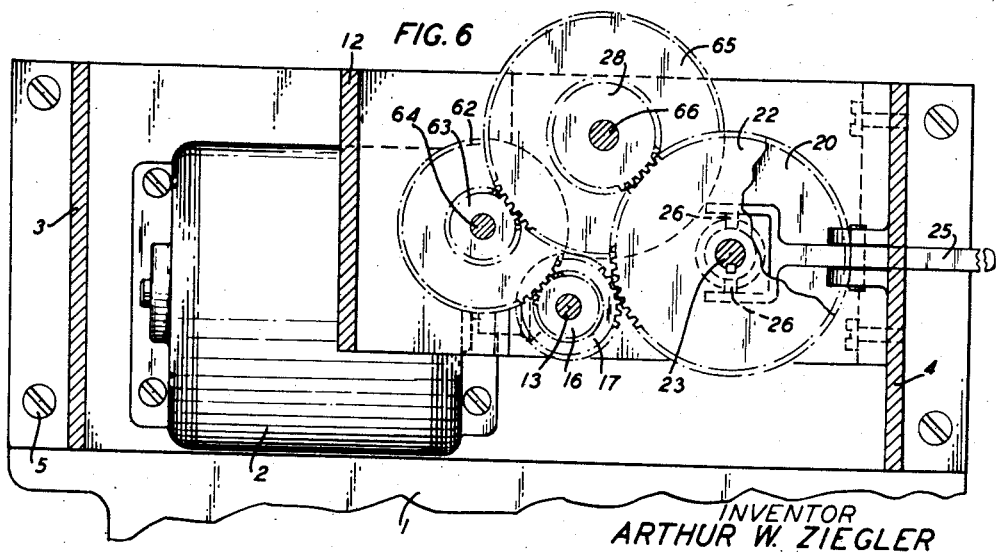
Fig. 6 is a horizontal sectional view taken on line 6—6 of Fig. 3, showing the relation of the different shafts of a two speed gearing mechanism, with portion of the base broken away.

A substantially L-shaped support 12, best seen in Figs. 2, 3 and 6, is secured at one end to the under side of plate 6, and its other end to the inner disposed side of upright supporting member 4 by similar screws 4x, the plate 6 and the L shaped plate 12 serve for rotatably mounting a shaft 13, and onto the lower disposed end portion of this shaft is keyed, as by a pin 19, a miter gear 14 engaging with a similar gear 15 keyed on the armature shaft of motor 2. On shaft 13 is keyed, as by a pin 18, the cluster pinions 16—17, the pinion 17, as shown in Figs. 2, 3 and 6, meshing with a gear 20 secured to one end of a sleeve 21, to the other end of which is secured a similar gear 22. The sleeve 21 is held against rotation on a shaft 23, Figs. 3, 4, 5 and 6, by a key member 24, but may be moved longitudinally on this shaft under control of a handle lever 25 pivoted at 25x and having a forked shaped end provided with studs as 26 engaging an annular groove 27 in the sleeve 21, as shown in Figs. 2, 3 and 6.

The operation of lever 25 from the position marked F to the position marked S, Figs. 3 and 7, is effective to move the gear 20 out of engagement from pinion 17 while positioning the gear 22 in engagement with a pinion 28 for actuating the shaft 23 at a slower speed than that imparted by the direct engagement of pinion 17 with the gear 20 for a purpose which will be hereinafter described in detail.

The shaft 23 is journaled at its lower disposed end in the L-shaped mounting plate 12, and at its middle length portion in the plate 6, while the top disposed end of this shaft projects from a hub formed with the plate 7, and on this end of shaft 23 is mounted for rotation therewith a drum 29 having teeth T to form a sprocket wheel for driving a belt 30 fitted over another sprocket wheel 31, the latter being mounted for free rotation on a spindle 32 fitted and secured into an eccentric sleeve 33 for rotary adjustment at one end into a bearing formed in the plate 6, and its other end into a boss 34 cast integrally with the plate 7, the sleeve 33 being provided at its lower disposed end portion with an arm 35, the free end of which is provided with a hole registering with an arcuated slit formed in the plate 6, as shown in Figs. 5 and 6, engaged by a screw 36 serving for securing the sleeve 33, and thereby the spindle 32 and the sprocket 31 mounted thereon in adjusted position relative to the tension of the belt 30 running over the sprockets 29 and 31.

On shaft 23, in position between the plates 6 and 7, is mounted a magnetic clutch MC in the form of a drum shaped pole piece 37, keyed to the shaft 23 and fitted with a ring shaped coil 38, the terminal ends of which are connected to respective slip rings 39 and 40, in turn contacting with respective brushes 41 and 42 secured on a stud 43, of insulating material, fitted into a drilled hole in the plate 6.

The armature of the magnetic clutch MC is constructed in the form of a disc 44 which is secured to the hub end portion of a pinion 45 mounted for free rotation on shaft 23. Pinion 45 meshes with a gear 46 keyed on a shaft 47 journaled at its lower end in the plate 6, and its upper disposed end in the plate 7, but extends above this plate for mounting a pinion 47x keyed thereon by a pin 49. On lug members 10 and 11, which are formed with the plate 7, is mounted for sliding movement thereon a bar 50 and a stationary bar 51, best seen in Figs. 2, 3 and 4. The bar 50, at one end portion, forms a gear rack disposed in engagement with pinion 47x, and on this bar is secured, as by a screw 52 a carriage 53 having forked lug portions 54—55, Figs. 2 and 4, engaging the stationary bar 51 for sliding movement therealong upon the operation of bar 50 as imparted by the rotation of pinion 47x. On the carriage 53, best seen in Fig. 4, is mounted a lamp 56, a light reflector 57, and a screen plate 58, the latter being secured to the carriage by two similar screws 59 in close proximity to the straight length portion of belt 30.

Figure 4:
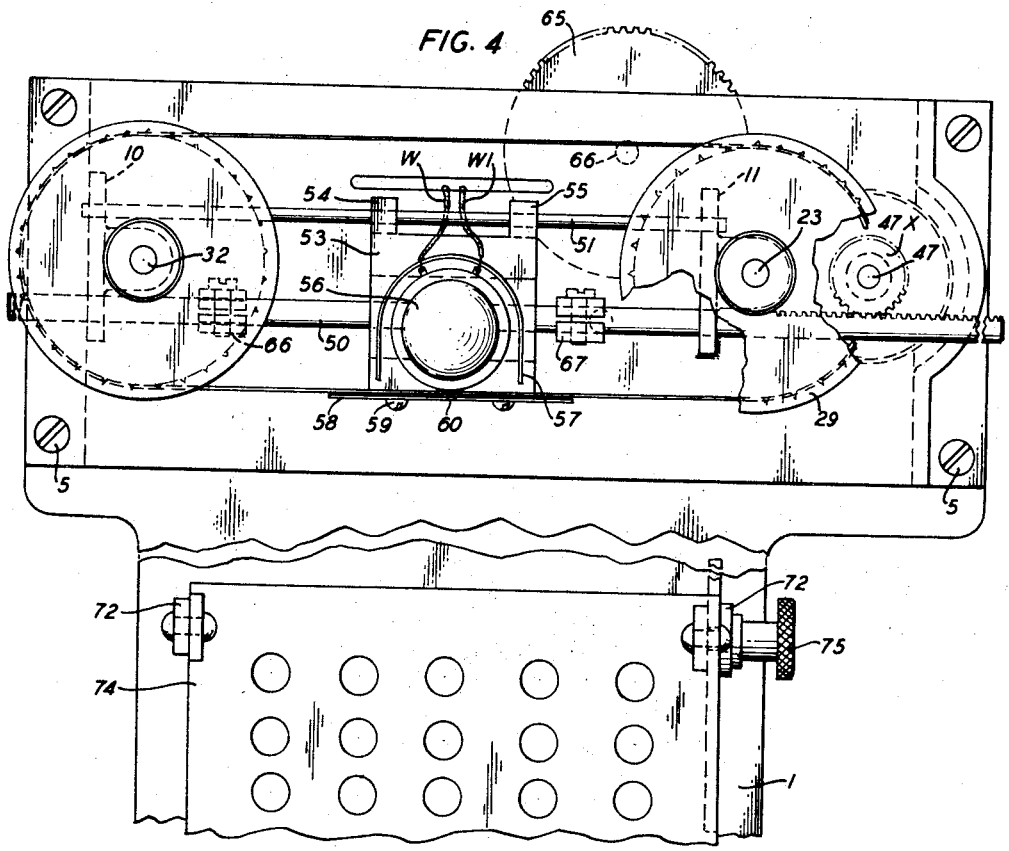
Fig. 4 is a top view showing the carriage actuating gear mechanism and the carriage moved in a position similar to that shown in Fig. 3, the base being shown with portion broken away.

The screen plate 58, as shown in Figs. 3 and 4, is provided with a slit 60 forming an elongated light path common to the obliquely disposed rows of light paths LP in the form of perforations in the belt 30, the diameter of such perforations, like the width of slit 60, being, for practical reasons, of the order of .050 inch.

Figure 8:
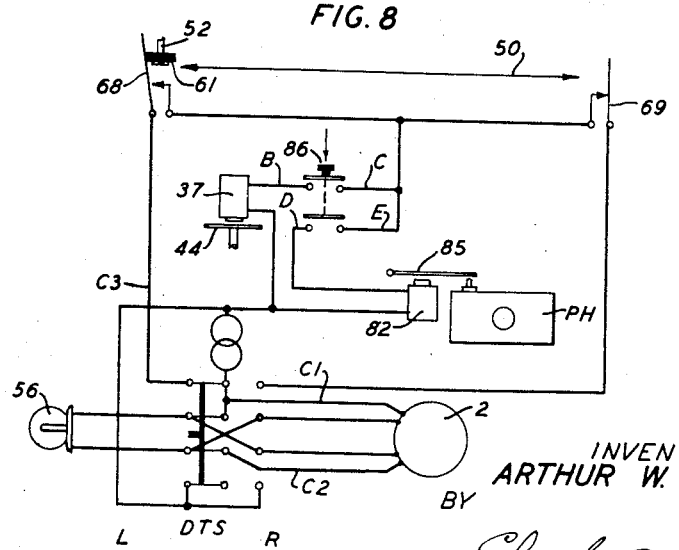
Fig. 8 is a view of a circuit connecting the different electrical devices in the shutter speed recording apparatus.

On the screw 52 which secures the carriage 53 to the bar 50, is mounted a roller 61, Figs. 3 and 8, constructed of insulating material, serving for engaging the contacts 68 and 69, for limiting the movement of carriage 53 in either one of two operating directions, as effected by the motor through the pinion 45, gear 46, and pinion 47x, engaging the rack portion of bar 50.

The low speed gearing mechanism above mentioned, for actuating the shaft 23, and thereby the belt 30 through sprocket wheel 29, comprises the angle gears 14 and 15, the gear 16 of cluster gears 16—17 engaging a gear 62 mounted for rotation as a unit with pinion 63 keyed on a shaft 64, journaled at one end in the L-shaped plate 12, and its other end in the plate 6. Pinion 63 engages a gear 65 mounted for rotation with the gear 28, above mentioned, keyed on a shaft 66 by a pin 67, the gear 28 being engaged by the gear 22 upon the operation of handle lever 25 in position for disengaging the gear 20 from pinion 17 while engaging the gear 22 with the pinion 28. Through the above mentioned gearing, the speed of sprocket wheel 29 is one turn per second.

The linear speed of the perforated belt 30, when actuated through the gearing mechanism comprising the pinion 17 in mesh with gear 20 using a 2 inch diameter sprocket wheel, is of the order of 62.8 inches per second, while the linear movement of the belt when driven by the low gear reduction mechanism, is of the order of 6.28 inches, the motor operating at a rate of 1800 revolutions per minute.

On the bar 50 are mounted the collar members 66 and 67 provided as a matter of safety in the operation of the device for arresting the movement of this bar and that of the carriage 53 carried thereby upon the engagement of these collars with the lug members 10 and 11 respectively, by causing the slipping of the clutch disc 44 against the pole piece 37, in addition to the control operation of the motor upon the operation of contacts 68 and 69 by roller member 61 at the conclusion of each shutter speed recording operation.

The base 1 is provided with two pairs of lug members 70—71 serving for pivotally mounting the pairs of arms 72—73, Figs. 1, 3, 4 and 5, to the free ends of which is pivoted a supporting plate 74, which may be moved for positioning the photographic apparatus PH in adjusted position relative to a lens L1 and thereby relative to the slit 60 in the screen plate 58 where the arms supporting the table 74 may be secured along an arcuated groove 76 in a sector shaped upright member 77 by a knob 75, screw threaded in the adjacent arm 72. On the mounting plate 74 is secured an inverted U-shaped support 78 held on this plate by a number of bolts 79 and 80, while on support 78 is mounted the heel piece 80 of an electromagnet 82, the heel piece being secured to the support 80 by a number of screws 81, while the electromagnet 82 is secured to the heel piece by a screw 83, Fig. 1, threading into the core of this magnet.

A pair of upwardly extending arms 84, which are formed with the heel piece 80, serve for mounting, as on pivot 86y, an armature 85 which is held in the retracted position against a stop lug 84x by a tension spring 87 having one of its ends hooked to a stud 88, and its other end to the magnet's armature 85, as shown in Fig. 1, while an adjustable knob 89 serves for controlling the movement of the armature 85, and thereby the operation of plunger 90 in the photographic apparatus PH, the latter being held securely on the extending portion of the heel piece 80 by a knob 92.

In the present device, at the low speed of one turn of sprocket 29 per second, considering the screen plate stationary, 562.5 light paths would be seen passing the slit 60 in one second for each 6.28 inches of belt 30 as obtained by the 2 inches diameter sprocket wheel, while the speed of the screen plate is of the order of .785 inch per second obtained by the operation of pinion 47x. However, it is to be noted that the direction of that length portion of the belt which passes in position adjacent the screen plate 58, moves in opposite direction to the motion of that plate irrespective of the direction of rotation of the constant speed motor, with the result that 62.5 of the light paths are rendered negative and therefore only 500 light paths which emanate from the light source through the light paths in the belt, and the light path in the screen plate for each second time, will be recorded, and the time interval value between each dot will therefore be $$\frac{1}{500}$$

at the low speed of one turn per second of the driving sprocket 29, but a time interval of $$\frac{1}{5000}$$

between each light path obtained at the speed of 10 turns per second for the high speed of the sprocket 29 with the screen plate travelling at a speed of 7.85 per second.

The operating speed of a shutter in a photographic apparatus may easily and conveniently be determined by the number of light dots printed on the film in such apparatus, as disclosed for example by the individual light dot pattern P for a so-called in-between the lens shutter, shown in Fig. 10, or in the patterns P and P1 for a focal plane shutter, the two successive records P and P1 being added and then divided by two so as to obtain an average number of light dots as a true speed of the focal plane shutter under test.

In a typical speed recording operation of a shutter in a photographic apparatus, considering the bar 50, Figs. 3, 4 and 8, and therefore the carriage 54 in the starting position to the left side of the mounting frame for example, as observed from the front elevation view Fig. 3 of the drawing, causes the insulated roller 61 to open the left disposed contact 68, Figs. 3 and 8. In that position of the carriage the manual operation of the double throw switch DTS to its left position, is effective to close the operating circuit of motor 2 and of the lamp 56 through leads C1 and C2 from the current generator and prepare an energizing circuit for the magnetic clutch 37 through the conductor C3 to cause the operation of the carriage 53 and the energization of magnet 82 serving for actuating the shutter in the photographic apparatus.

The manual operation of knob 86 is effective first to bridge the contacts BC for energizing the magnetic clutch 37, while the continued movement of knob 86 bridges the contacts DE to cause the energization of magnet 82, and thereby the operation of the shutter in the photographic apparatus under test for recording the number of light dots projected thereon by the conjoint operation of the belt 30 and of the screen plate 58 on carriage 53 so as to obtain a speed record as shown at P for an in-between the lens shutter, or a speed record as P—P1 for a so-called focal plane shutter, which is arrived at by adding the number of light dots in the two groups P and P1 and dividing the result by two thus giving the average number of light dots representing the true speed of the focal plane shutter.

What I claim is:

1. A device for recording the operating speed of a shutter in a photographic apparatus, said device comprising a constant speed motor, a driving and a driven sprocket wheel, a belt having means for engaging said sprocket wheels, multiple speed gear mechanisms actuated by said motor, one of said mechanisms including a normally ineffective clutch element, means manually operable for selectively connecting said driving sprocket wheel to either one of said speed gear mechanisms, light paths carried by said belt arranged in equal spaced relation to each other in oblique disposed rows across the width of said belt, a screen plate disposed to one side of a straight portion of said belt and adjacent thereof, a lamp disposed to the opposite side of the straight portion of said belt, said plate having an elongated light path common to the light paths in said rows actuated by the operation of the selected gear mechanism and said clutch element simultaneously with the operation of said belt for projecting a number of light dots from said lamp onto a film in the photographic apparatus for recording the operating speed of the shutter therein in terms of the number of light dots impinged onto such film in a predetermined time defined by the operation of said motor and electromagnetic means operable in timed relation with said clutch element for actuating such shutter.

2. A device for recording the operating speed of a shutter in a photographic apparatus, said device comprising a driving and a driven sprocket wheel, a belt mounted on said sprocket wheels having light paths disposed in oblique rows along the length thereof, a stationary and a movable bar, a carriage mounted on said bars, a constant speed motor, a gearing mechanism operatively connecting said driving sprocket wheel to said motor, a screen plate mounted on said carriage in position adjacent to the outer disposed surface of a straight side portion of said belt, another gearing mechanism including an electromagnetic clutch for operatively connecting said movable bar to the first mentioned gear mechanism for actuating said carriage, said screen plate having a slit therein forming a light path, a lamp and a reflector for said lamp mounted on said carriage for reflecting the light from said lamp through the light paths in said belt and the light path in said screen plate onto a film in the photographic apparatus for recording the number of light dots impinged onto the film upon the operation of the shutter in such apparatus in timed relation with the conjoint operation of said belt and said carriage by said motor and electromagnetic means for effecting the operation of the shutter upon the energization of said magnetic clutch.

3. A device for recording the operating speed of a shutter in a photographic apparatus, said device comprising a constant speed motor, a driving and a driven sprocket wheel, a gearing mechanism operatively connecting said driving wheel to said motor, a belt having means for engaging said sprocket wheels, a spindle for mounting said driven sprocket wheel, an eccentric for said spindle operable for controlling the tension of said belt on said wheels, means carried by said belt forming light paths disposed in oblique disposed rows relative to the width of said belt, a screen plate disposed in juxtaposition to one side of one of the straight side portions of said belt having a light path common to the light paths in said belt, a lamp disposed to the opposite side of said belt relative to the position of said screen plate and movable therewith by the operation of said gearing mechanism for projecting light dots through said light paths onto a film in the photographic apparatus upon the operation of said belt and said screen plate by said motor for recording the number of light dots passing in registry with the light path in said screen plate and electromagnetic means operable in timed relation with the operation of said belt and said screen plate for actuating the shutter in the photographic apparatus.

4. A device for recording the operating speed of a shutter in a photographic apparatus, said device comprising a frame having a base, a constant speed motor mounted on said base, a rotary shaft and a spindle mounted on said frame, a sprocket wheel keyed to said shaft, a sprocket wheel mounted for free rotation on said spindle, gearing mechanisms connecting with said motor for actuating said shaft, manually operable means for selectively connecting said shaft to either one of said gear mechanisms, a belt fitted on said sprockets, said belt having rows of light paths disposed in oblique relation along the length thereof, an electromagnetic clutch mounted on said shaft, a gear carried by the armature of said clutch, another shaft mounted on said frame having a gear meshing with said clutch gear, a pinion keyed to one end of the last mentioned shaft, a gear rack mounted for sliding movement on said frame meshing with said pinion for actuating said gear rack upon the energization of said magnetic clutch, a carriage mounted on said gear rack for movement in line parallel to said belt, a lamp and a screen plate mounted on said carriage in juxtaposition to said belt, said screen plate having an elongated light path therein disposed at right angles to the movement of said carriage and cooperating with said light paths in said belt for projecting light dots from said lamp onto a film in the photographic apparatus upon the operation of the shutter therein for recording the number of light dots in said belt passing in registry to said elongated light path in said screen upon the operation of the selected gear mechanism by said motor and an electromagnet operable in timed relation with the energization of said magnetic clutch for operating the shutter in the photographic apparatus.

5. A device for recording the operating speed of a shutter in a photographic apparatus, said device comprising a mounting frame having a base, a motor secured to said base, a gearing mechanism actuated by said motor, a movable and a stationary bar disposed in parallel relation to each other on said frame, a carriage secured to said movable bar and having a sliding engagement with said stationary bar, a shaft connected to said gear mechanism, a sprocket wheel keyed to said shaft at one end thereof, a spindle, a sprocket wheel mounted for rotary movement on said spindle, a belt fitted over said sprockets, said belt having oblique disposed rows of perforations therein forming light paths, a lamp, a reflector and a screen plate mounted on said carriage, said screen plate having a slit therein forming a light path intersected by the light paths in said belt, an electromagnet for operating the shutter in the photographic apparatus, another gearing mechanism operated by the first mentioned gearing mechanism including a magnetic clutch operable for actuating said carriage simultaneously with the operation of said magnet and of said belt for projecting the light from said lamp onto a film in such photographic apparatus for recording the operating speed of the shutter on the film therein.

6. A device for recording the operating speed of a shutter in a photographic apparatus, said device comprising a constant speed motor, a sprocket wheel, a gearing mechanism operatively connecting said sprocket wheel to said motor, a spindle, another sprocket wheel mounted for free rotation on said spindle, a belt having means for engaging said sprocket wheels, said belt having rows of openings disposed in oblique relation to the length thereof forming light paths, a pair of parallelly disposed bars, a carriage supported by said bars and movable in line parallel to the movement of said belt, another gear mechanism comprising a normally ineffective clutch connecting with the first mentioned gear mechanism for actuating said carriage, a lamp, a reflector associated with said lamp, and a screen plate mounted on said carriage having a light path therein intersected by said light paths in said rows for projecting light dots onto a film in the photographic apparatus upon the operation of the first mentioned gear mechanism and by the operation of said clutch and the second mentioned gear mechanism by said motor and means manually operable to render said clutch effective in timed relation with means for operating the shutter in the photographic apparatus.

7. A device for recording the operating speed of a shutter in a photographic apparatus, said device comprising a base, a motor mounted on said base, means actuated by said motor for projecting light dots onto a film in such apparatus, said means including a magnetic clutch, a plurality of upwardly extending arms pivoted at one end to said base, a mounting plate for supporting the photographic apparatus pivotally connected to the free ends of said arms for movement in different spaced relation to said base for focal adjustment of the photographic apparatus, relative to said light projecting means, an electromagnet having a pole piece secured to said mounting plate, an armature for said magnet pivoted on said pole piece extending in operative relation with the shutter of the photographic apparatus for actuating the latter upon the energization of said magnet, means manually operable to cause the energization of said clutch and said magnet for actuating the shutter in the photographic apparatus in timed relation with the operation of said light projecting means, and means carried by said armature for controlling the movement of said armature relative to the shutter.

8. A device for recording the speed of a shutter in a photographic apparatus in which a lamp is energized simultaneously with the operation of two cooperating light path carrying means movable at different but constant speeds relative to each other, a motor, a gearing mechanism connected to said motor for actuating one of said light path carrying means, said mechanism including a magnetic clutch energized for actuating the other of said light path carrying means at another speed simultaneously with the energization of said motor and said lamp, and an electromagnet energized upon the operation of said lamp for operating the shutter in the photographic apparatus for projecting series of light dots onto a film in such apparatus for recording the speed of the shutter therein in terms of the number of light dots printed onto the film.

9. A device for recording the speed of a shutter in a photographic apparatus, said device comprising a motor, a gearing mechanism actuated by said motor, a movable belt actuated by said mechanism, said belt having rows of light paths disposed in oblique relation to the length thereof, a gear reduction mechanism actuated by the first mentioned mechanism, a carriage actuated thereby, a screen plate mounted on said carriage in position adjacent to said belt, said screen plate having a light path therein intersected by the light paths in said belt upon the operation of each of said mechanisms, a lamp mounted on said carriage disposed in registering position to the light paths in said screen, an electromagnet operable in timed relation with the energization of said motor and said lamp for actuating the shutter in the photographic apparatus for transmitting a series of light dots onto a film in the apparatus for recording the speed of the shutter therein in terms of the number of light dots impinged onto such film.

References Cited in the file of this patent

UNITED STATES PATENTS

| 1,431,897 | Riddell | Oct. 10, 1922 |
| 2,296,676 | Kearsley | Sept. 22, 1942 |

FOREIGN PATENTS

| 400,100 | Germany | Apr. 1, 1923 |